United States Patent [19]

Hershenson

[11] 3,716,548

[45] Feb. 13, 1973

[54] 2-(CHLOROPYRIDYLAMINO)-1-PYRROLINES

[75] Inventor: Fred M. Hershenson, Morton Grove, Ill.

[73] Assignee: G. D. Searle & Co., Chicago, Ill.

[22] Filed: April 30, 1971

[21] Appl. No.: 139,175

[52] U.S. Cl. ......260/296 R, 260/295 S, 260/294.8 R, 424/263, 424/266
[51] Int. Cl. ............................................C07d 31/42
[58] Field of Search ........................260/296 R, 295 S

[56] References Cited

UNITED STATES PATENTS 3,674,806   7/1972   Bluhm et al......................260/296 R Primary Examiner—Alan L. Rotman
Attorney—John M. Brown, John J. Kolano, Elliot N. Schubert, Lowell C. Bergstedt, Sybil Meloy, Walter C. Ramm and Helmuth A. Wegner

[57] ABSTRACT

1-Pyrrolines having a chloropyridylamino substituent at the 2-position are described herein. The compounds involved are useful as anti-hypertensive agents. To prepare the present compounds, 2-pyrrolidinone is reacted with phosphorus oxychloride and the resulting product is then reacted with an aminopyridine.

1 Claim, No Drawings

2-(CHLOROPYRIDYLAMINO)-1-PYRROLINES

The present invention relates to 2-(chloropyridylamino)-1-pyrrolines. More particularly, it relates to a group of compounds having the following general formula

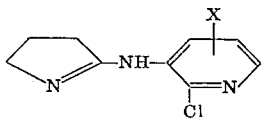

wherein X is selected from the group consisting of hydrogen, methyl, and halogen and is preferably located at the 4-position on the pyridine nucleus. The halogen atoms referred to above include fluorine, chlorine, bromine, and iodine although chlorine is the preferred halogen. Although the present compounds are depicted as 2-amino-1-pyrrolines, they can tautomerize to give 2-iminopyrrolidines.

The organic bases of this invention form pharmaceutically acceptable salts with a variety of inorganic and strong organic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of the present invention are prepared by the reaction of 2-pyrrolidinone with phosphorus oxychloride followed by reaction of the resulting product with an aminopyridine of the formula

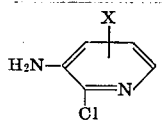

wherein X is defined as above. The reaction with the aminopyridine is carried out with heating in an inert solvent such as benzene.

The present compounds are useful as anti-hypertensive agents. However, these compounds do not show the analgesic effects exhibited by related prior art anti-hypertensive compounds. In addition, the effect of the present compounds is prolonged.

The anti-hypertensive utility of the present compounds is demonstrated by the following test procedure which makes use of the fact that chronic administration of desoxycorticosterone acetate induces a self-sustaining hypertension that is similar in many respects to essential hypertension in man (D.N. Green et al., *American Journal of Physiology*, 170, 94, 1952). In this test, 50-g. male Charles River rats are implanted with a 20 mg. wax pellet containing 10 mg. of desoxycorticosterone acetate. After 5 weeks, their systolic blood pressures are measured electrosphygmographically on the tail artery. The following day, groups of five rats are then given 60 mpk. of test compound intragastrically. Four hours later, the blood pressures are again measured and the decrease in pressure from control day is calculated and compared with concurrent controls. A compound is considered active if it produces a significant decrease in systolic blood pressure. When 2-(2-chloro-3-pyridylamino)-1-pyrroline was tested by this procedure, it produced a significant decrease in blood pressure.

The following Examples are presented to further illustrate the present invention; they should not be construed as limiting it in spirit or in scope. In these examples, temperatures are indicated in degrees centigrade (°C.) and quantities are indicated in parts by weight unless parts by volume are specified. The relationship existing between parts by weight and parts by volume is the same as that existing between grams and milliliters.

EXAMPLE 1

To a solution of 34 parts of 2-pyrrolidinone in 135 parts of benzene there is added portionwise, with stirring at room temperature, 31 parts of phosphorus oxychloride. Stirring is continued at room temperature for 2 hours and then a solution of 26 parts of 3-amino-2-chloropyridine in 270 parts of benzene is added portionwise with stirring over a period of 15 minutes at room temperature. The mixture is then heated to reflux for 4 hours before it is allowed to cool to room temperature and allowed to stand at that temperature for 16 hours. The benzene supernatant is decanted from the sticky residue which is dissolved in 200 parts of water and filtered. The aqueous solution is then washed with 140 parts of ether before it is made alkaline by the addition of 200 parts by volume of 10 N sodium hydroxide solution. The resulting mixture is extracted with a 1:1 by volume ether-chloroform solution and the extract is dried over anhydrous sodium sulfate; the solvent is evaporated under reduced pressure to leave a residual thick green oil. Trituration of the oil with cyclohexane causes it to solidify and the solid is separated by filtration and washed twice with cyclohexane. It is then recrystallized from a mixture of cyclohexane and benzene (10:1 by volume) to give 2-(2-chloro-3-pyridylamino)-1-pyrroline melting at about 110.5°–113°C. This compound has the following formula

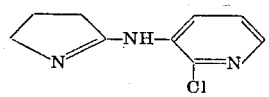

EXAMPLE 2

A solution is prepared from 3.0 parts of 2-(2-chloro-3-pyridylamino)-1-pyrroline and 175 parts of dry ether. To this solution is added 10 parts by volume of a 7.5 N solution of hydrogen chloride in 2-propanol. The resulting mixture is cooled and the solid which forms is separated by filtration and washed with dry ether. It is then recrystallized from acetonitrile to give 2-(2-chloro-3-pyridylamino)-1-pyrroline hydrochloride melting at about 256°–256.5°C.

What is claimed is:

1. 2-(2-Chloro-3-pyridylamino)-1-pyrroline.

* * * * *